Patented Apr. 28, 1936

2,038,705

UNITED STATES PATENT OFFICE 2,038,705

ETHERS OF POLYHYDRIC ALCOHOLS

Alfred William Baldwin, Blackley, Manchester, and Isidor Morris Heilbron and William Edward Jones, Victoria University, Manchester, England, assignors to Imperial Chemical Industries Limited, a corporation of Great Britain No Drawing. Application February 27, 1935, Serial No. 8,552. In Great Britain March 5, 1934

9 Claims. (Cl. 260—54)

This invention relates to new chemical compounds and more particularly to new aliphatic ethers of glycerol characterized by the fact that the ether grouping is in the beta position of the carbon chain of the polyhydric alcohol.

This invention has as one of its objects the preparation of new ethers of glycerol. A further object of the invention lies in the preparation of new intermediates from which these new ethers may be obtained. A still further object resides in the novel method whereby these new ethers, as well as some ethers which have previously been known, are prepared. Another object is to prepare new compounds which have both valuable technical uses and also value as intermediates for preparing useful derivatives thereof. Other objects will appear hereinafter.

These objects are accomplished by the following invention wherein new chemical compounds having the general formula:

in which R represents an aliphatic radical containing eight or more carbon atoms are prepared for the first time. These compounds are prepared from new aliphatic ethers of six membered cyclic acetals derived from glycerol. The novel process whereby such ethers are obtained is applicable not only for preparing the new compounds covered by the present invention, but is also useful in preparing some ethers which are already known. In brief, these new aliphatic ethers of glycerol are obtained by effecting interaction between an alkali metal derivative of an alkylidene or aralkylidene derivative of glycerol with an inorganic ester of an aliphatic alcohol containing a chain of at least eight and preferably ten to twenty carbon atoms, and by then removing the alkylidene or aralkylidene residue by hydrolysis.

According to the preferred embodiment of the invention, an alkali metal derivative of 1,3 benzylidene glycerol is interacted with an alkyl halide or an alkali metal salt of an alkyl sulphuric ester in order to obtain these new compounds.

Several descriptions of the cyclic acetals of polyhydric alcohols which are used in this invention may be found in the chemical literature. Formal-glycerine (methylene ether of glycerol) and the acetaldehyde-glycerines (ethylidene ether of glycerol) are described by, among others, van Roon (Receuil des Travaux Chemiques des Pays-Bas, 1929, 48, 173); the benzylidene ether of glycerol is described by Hill, Whelen and Hibbert (Journal of the American Chemical Society, 1928, 50, 2235); these substances are examples of the alkylidene and aralkylidene derivatives of polyhydric alcohols the alkali metal derivatives of which are used in accordance with the invention.

The invention is illustrated but not limited by the following examples in which the parts are by weight.

Example 1

10 parts of benzylidene glycerol (Hill, Whelen and Hibbert loc. cit.) are added to 1.9 parts of potassium already melted and broken up in 120 parts of benzene. The mixture is boiled under a reflux condenser until the potassium has completely dissolved. 60 parts of cetyl iodide are added and the solution is kept boiling for five hours. It is then washed with water and dried over potassium carbonate. The benzene and any excess of cetyl iodide are removed by distillation under reduced pressure. The residual 2-cetyl-1,3-benzylidene glyceryl ether is a low melting point solid. It is purified if necessary by crystallizing from aqueous alcohol. It has M. P. 34.5-35° C.

Ten parts of this compound are mixed with 300 parts of 75% aqueous alcohol containing 10 parts of concentrated hydrochloric acid and boiled for about one hour. The product (beta cetyl glyceryl ether) which is obtained by diluting with water or by evaporation is, when recrystallized from alcohol, a colorless crystalline solid, M. P. 60-61° C. It gives a diphenylurethane, M. P. 82-83° C.

Example 2

When octadecyl iodide is used instead of cetyl iodide 2-octadecyl-1,3-benzylidene-glyceryl ether is obtained, M. P. 43-44° C. and this, on hydrolysis gives beta octadecyl glyceryl ether, M. P. 62-63° C. (diphenylurethane, M. P. 83-84° C.)

Example 3

64 parts of 1,3 benzylidene glycerol are stirred at 120-124° C. and 4 parts of sodium added. Stirring is continued at this temperature until the sodium has completely dissolved. 60 parts of cetyl sodium sulphate are added and the mixture is stirred at 140-150° C. for 5 to 6 hours. The mass is then poured into hot water, and the oil separated and freed from unchanged 1,3-benzylidene glycerol by washing with hot water. The cetyl ether of 1,3 benzylidene glycerol thus obtained is then hydrolyzed to yield beta cetyl glyceryl ether as in Example 1.

The so obtained new alkyl ethers of polyhydric alcohols are colorless, oily, or waxy substances. While the 1,3 benzylidene glycerol is preferred to other acetals for use in the present invention largely because of the ease with which 1,3 benzylidene glycerol is separated from its 1,2 isomer, it is to be understood that the use of acetals derived from other aldehydes beside benzaldehyde is comprehended by the present invention. Formaldehyde, acetaldehyde, butyraldehyde, heptaldehyde, salicylaldehyde, anisaldehyde, cinnamicaldehyde and furfural are examples of aldehydes whose 1,3 cyclic acetals may be used in the processes described in this specification.

Various other inorganic esters of aliphatic alcohols having a chain of at least eight carbon atoms may be used in the processes of the present invention beside cetyl iodide, octadecyl iodide, and cetyl sodium sulphate. Examples of these other inorganic esters are alkyl halides such as: nonyl bromide, decyl bromide, undecyl chloride, dodecyl chloride, tetradecyl chloride, hexadecyl chloride, and ceryl chloride. The sodium alkyl sulphates which correspond to the alkyl halides just mentioned may also be used. The use of methyl iodide, ethyl bromide, propyl bromide, and amyl chloride in preparing old compounds by the process herein disclosed is also contemplated. Unsaturated aliphatic halides such as undecylenyl chloride and docecylenyl chloride and octadecylenyl bromide may be used in preparing the new compounds covered by the present disclosure. According to the invention, substituted alkyl halides containing such additional substituents as hydroxy, alkoxy, amino, nitro, and additional halogens may be used.

An example of an old compound which may be readily obtained according to the process herein disclosed is glycerol beta methyl ether. This compound may be made by interacting methyl iodide with an alkali metal derivative of 1,3 benzylidene glycerol followed by a hydrolysis step in which the benzylidene residue is removed.

Examples of the new compounds which have been prepared and which are comprehended by the present invention are: beta decyl glyceryl ether, beta undecyl glyceryl ether, beta dodecyl glyceryl ether, beta tetradecyl glyceryl ether, beta cetyl glyceryl ether, beta octadecyl glyceryl ether, beta ceryl glyceryl ether, beta undecylenyl glyceryl ether, beta octadecylenyl glyceryl ether, and beta ricinoleyl glyceryl ether.

The compounds comprehended by the present invention are useful as ingredients of textile treatment media, as perfume fixatives, and as intermediates which can be esterified to obtain useful derivatives. This last mentioned use of these compounds is described in the co-pending application of Baldwin and Heilbron, Serial No. 8,551, filed February 27, 1935.

As many apparently widely different embodiments of this invention may be made without widely departing from the spirit and scope thereof, it is to be understood that the invention is not limited to the specific embodiments thereof except as defined in the appended claims.

We claim:

1. A new chemical compound having the general formula:

in which R represents an aliphatic radical containing a chain of eight or more carbon atoms.

2. A new chemical compound having the general formula:

in which R represents an aliphatic hydrocarbon group containing a chain of eight or more carbon atoms.

3. A new chemical compound having the general formula:

in which R represents an alkyl group containing a chain of ten to twenty carbon atoms.

4. A new chemical compound having the formula:

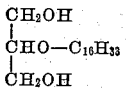

5. A new chemical compound having the formula:

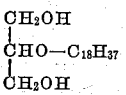

6. A new chemical compound having the general formula:

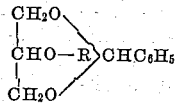

in which R represents an alkyl group having a chain of eight or more carbon atoms.

7. A process of making a beta alkyl glyceryl ether which comprises reacting the alkali metal derivative of 1,3 benzylidene glycerol with an alkyl halide in which the alkyl group contains a chain of eight or more carbon atoms, and hydrolyzing the product obtained from the aforementioned sequence of steps.

8. The process of making beta cetyl glyceryl ether which comprises adding 1.9 parts of potassium melted and broken up in 120 parts of benzene to 10 parts of benzylidene glycerol; boiling said mixture until the potassium has completely dissolved; adding 60 parts of cetyl iodide and continuing the boiling for about five hours; purifying said product by washing with water, drying, and removing the benzene and excess of cetyl iodide by distillation under reduced pressure; and hydrolyzing 10 parts of the compound obtained from the preceding steps by boiling with 300 parts of 75% aqueous alcohol containing 10 parts of concentrated hydrochloric acid.

9. The process of making beta cetyl glyceryl ether which comprises heating 64 parts of 1,3 benzylidene glycerol to 120–124° C., adding 4 parts of sodium, stirring at this temperature until the sodium has completely dissolved, adding 60 parts of cetyl sodium sulphate, stirring the mixture at 140–150° C. for five to six hours, pouring the mass into hot water, washing the oil that separates with hot water, and hydrolyzing the resulting product by boiling it with a solution of hydrochloric acid in aqueous alcohol.

ALFRED WILLIAM BALDWIN.
ISIDOR MORRIS HEILBRON.
WILLIAM EDWARD JONES.